(No Model.)

A. W. SMITH.
FIFTH WHEEL FOR VEHICLES.

No. 576,167. Patented Feb. 2, 1897.

Witnesses
Wm. F. Doyle
J. A. Hilton

Inventor
Angus W. Smith
By H. B. Willson
Attorney

UNITED STATES PATENT OFFICE.

ANGUS W. SMITH, OF UNION CHURCH, MISSISSIPPI.

FIFTH-WHEEL FOR VEHICLES.

SPECIFICATION forming part of Letters Patent No. 576,167, dated February 2, 1897.

Application filed August 25, 1896. Serial No. 603,880. (No model.)

*To all whom it may concern:*

Be it known that I, ANGUS W. SMITH, a citizen of the United States, residing at Union Church, in the county of Jefferson and State of Mississippi, have invented certain new and useful Improvements in Fifth-Wheels for Vehicles; and I do declare the following to be a full, clear, and exact description of the invention, such as will enable others skilled in the art to which it appertains to make and use the same.

My invention has relation to improvements in fifth-wheels for vehicle running-gear; and the object is to simplify the construction of the same.

To this end the novelty consists in the construction, combination, and arrangement of the several parts of the same, as will be hereinafter more fully described, and particularly pointed out in the claims.

In the accompanying drawings the same figures of reference indicate the same parts of the invention.

Figure 1:
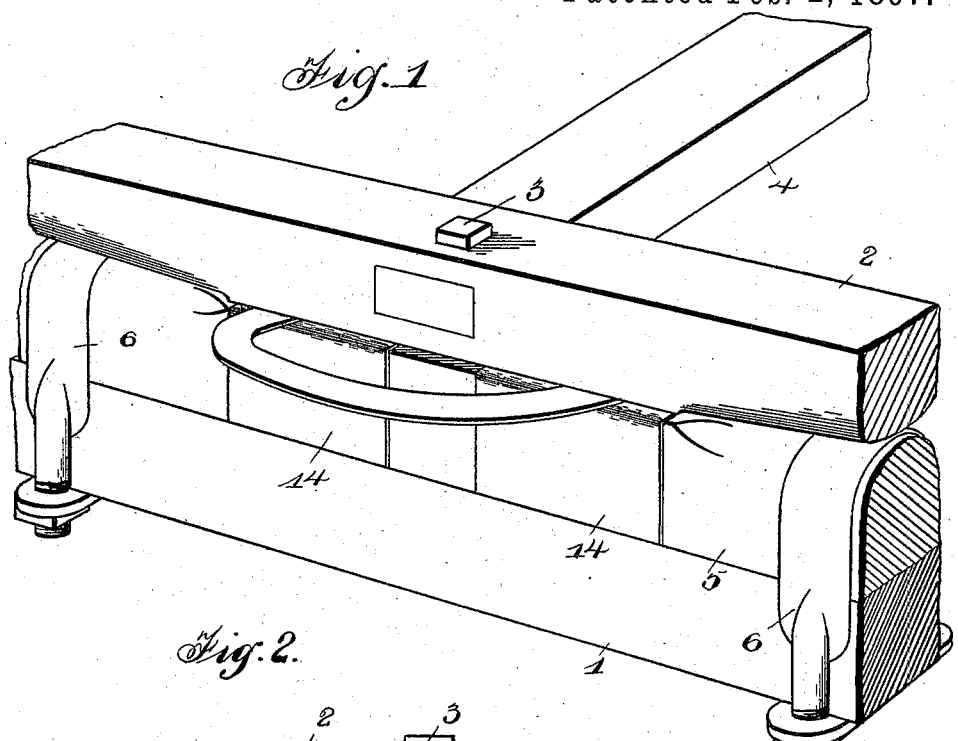
Figure 2:
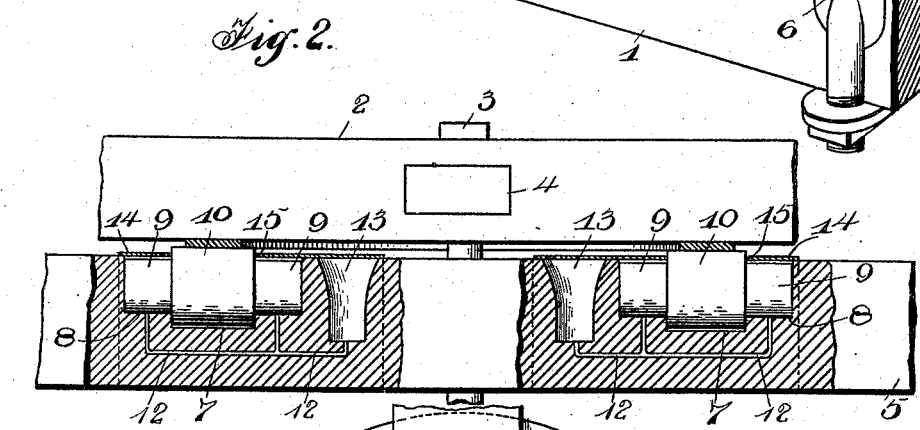
Figure 3:
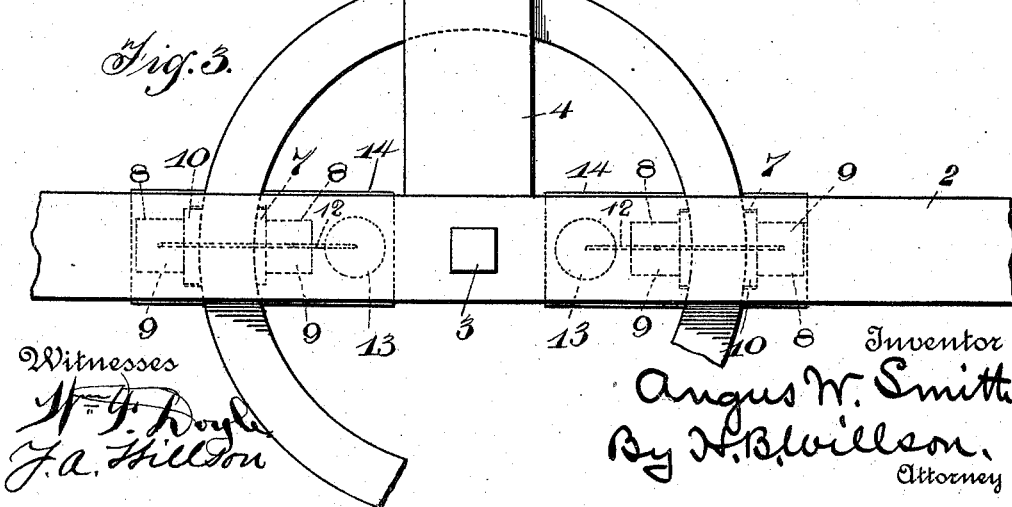

Figure 1 is a perspective view of the forward end of a vehicle running-gear embodying my invention. Fig. 2 is a longitudinal section, and Fig. 3 a top plan view, of the same.

1 represents the front axle; 2, the bolster; 3, the king-pin; 4, the coupling-pole, and 5 the rocker or axletree, secured to the axle by clips 6 6. This rocker is formed with two semicircular recesses 7 7, one of which is located on each side of the king-pin and immediately under the fifth-wheel. These recesses are each formed with semicircular bearings 8 8 in their ends, in which rest the journals 9 9 of the rollers 10 10, the face of which forms a rolling support for the fifth-wheel.

13 represents an oil cup or reservoir from which oil-ducts 12 12 lead to the bearings 8 8, and after the lubricant has worked through said bearings it finds its way by gravity into the recess 7, whence it is taken up by the roller 10 and applied to the contiguous face of the fifth-wheel.

14 represents a dust or dirt cap or cover secured to the rocker 5 and having a slot 15, through which the upper face of the roller projects, and it serves to protect the journal-bearings of the rollers from grit and dirt, as well as the oil-reservoir 13.

Having thus fully described my invention, what I claim as new and useful, and desire to secure by Letters Patent of the United States, is—

1. A vehicle running-gear, comprising the bolster and coupling-pole, the fifth-wheel secured thereto, the axle, the rocker mounted thereon, and provided with the semicircular roller-recesses 7 7, having end bearings 8 8, provided with oil-ducts 12, communicating with an oil-reservoir 13, the rollers 10 10 journaled in said recesses and forming a support for the fifth-wheel, and the king-pin 3, constructed and arranged substantially as shown and described.

2. The bolster provided with the roller-recess 7 having end bearings 8 8 and the oil-reservoir 13 provided with ducts 12 12, in combination with the roller 10 and the dust-guard 14, substantially as shown and described.

In testimony whereof I hereunto affix my signature in presence of two witnesses.

ANGUS W. SMITH.

Witnesses:
J. G. HAMILTON,
W. G. McDUFF.